United States Patent Office 3,476,718
Patented Nov. 4, 1969

3,476,718
POLYMERS OF EPOXY CYCLIC SULFONES
Edwin James Vandenberg, Foulk Woods, Del., assignor to Hercules Incorporated, Wilmington, Del., a corporation of Delaware
No Drawing. Filed July 17, 1967, Ser. No. 653,638
Int. Cl. C08f 13/00; C07d 63/12
U.S. Cl. 260—79.3                                    10 Claims

ABSTRACT OF THE DISCLOSURE

Homopolymers of an epoxy cyclic sulfone which is 3,4 - epoxy sulfolane, 7-oxa-3-thiabicyclo[4.1.0]heptane 3,3-dioxide or 8-oxa-4-thiabicyclo[5.1.0]octane 4,4-dioxide, and copolymers thereof with an oxirane or oxetane are described. The polymers are more hydrophilic than unmodified polyethers and are useful for yarns, fabrics, coatings, etc. The polymers are prepared by polymerizing the epoxy cyclic sulfone, or comonomer mixture thereof, in the presence of a modified organoaluminum or organomagnesium compound as catalyst.

---

This invention relates to polyethers and, more particularly, to polymers of epoxy cyclic sulfones.

In accordance with this invention, it has been found that new polymers, which contain repeating units of the formula

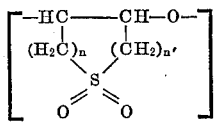

where $n$ and $n'$ are each 1 or 2, have unique and outstanding properties and are produced when an epoxy cyclic sulfone, having the formula

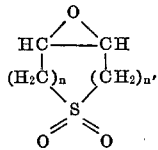

where $n$ and $n'$ are each 1 or 2, is homopolymerized or copolymerized with at least one other epoxide which is an oxirane or oxetane.

The polymers of this invention are produced by contacting one of the above epoxy cyclic sulfones or a mixture of one of the epoxy cyclic sulfones and one or more epoxide comonomers with, as catalyst, a modified organoaluminum or a modified organomagnesium compound. The modified organoaluminum compound is one which has been reacted with about 0.1 to about 1.5 moles of a chelating agent such as acetylacetone, benzoylacetone, acetoacetic acid, ethyl glycolate, oxalic acid, glyoxal monoxime, etc., and/or reacted with from about 0.1 to about 1.5 moles of water per mole of the organoaluminum compound. Exemplary of the organoaluminum compounds that can be so reacted with the chelating agent and/or water and used as catalyst are triethylaluminum, triisobutylaluminum, diethylaluminum hydride, etc. The modified organomagnesium compounds are compounds such as, for example, diethylmagnesium, which have been reacted with a polyreactive compound such as a compound containing at least two active hydrogens, e.g., water, glycols, ammonia, amines, ketones, etc., as, for example, with 0.1 to 1.2 mole of water or 0.2 to 0.8 mole of a polyhydric alcohol or polyhydric phenol per mole or organomagnesium compound.

The polymers of the epoxy cyclic sulfones of this invention range from liquids to solids and have molecular weights greater than about 25,000, preferably greater than about 50,000, and most preferably greater than about 100,000, which, when indicated by the reduced specific viscosity (RSV) of the polymer corresponds to an RSV greater than about 0.1, preferably greater than 0.2, and most preferably greater than 0.5. Those polymers of the epoxy cyclic sulfones which are homopolymers are normally crystalline solids characterized by unusually high melting points, good heat and light stability, and good mechanical properties. The homopolymers are particularly useful as films or fibers. Those polymers which are copolymers of the epoxy cyclic sulfone and at least one other epoxide comonomer will, depending on the composition and the particular epoxide comonomer used, range from liquids to solids. In the preferred molecular weight range, they are normally amorphous or crystalline solids and contain from about 0.2% to about 99%, and preferably from about 0.5% to about 95% epoxy cyclic sulfone. The solid copolymers are particularly useful as rubbers, plastics, films, fibers and the like.

The epoxide monomers which are copolymerizable with the epoxy cyclic sulfones in accordance with this invention are either oxiranes or oxetanes. Exemplary of the oxiranes are the alkylene oxides such as ethylene oxide, 1,2-propylene oxide, butene oxides (butene-1-oxide and the cis- and trans-butene-2-oxides), isobutylene epoxide; substituted alkylene oxides such as epichlorohydrin, epibromohydrin, epifluorohydrin, methallyl chloride epoxide, trifluoromethyl ethylene oxide, perfluoropropylene oxide, perfluoroethylene oxide, vinyl chloride epoxide, dichloroisobutylene epoxide, etc.; cycloaliphatic epoxides such as cyclohexene oxides, vinyl cyclohexene monoxide, vinyl cyclohexene dioxide, α-pinene epoxide, dipentene epoxide, etc.; epoxy ethers such as alkyl glycidyl ethers, as, for example, methyl glycidyl ether, ethyl glycidyl ether, isopropyl glycidyl ether, isobutyl glycidyl ether, tert-butyl glycidyl ether, n-hexyl glycidyl ether, n-octyl glycidyl ether, etc.; phenyl glycidyl ether, chlorophenyl glycidyl ethers, nitrophenyl glycidyl ethers, alkylphenyl ethers, chloroalkyl glycidyl ethers, such as chloroethyl glycidyl ether; unsaturated glycidyl ethers such as vinyl glycidyl ether, allyl glycidyl ether, o-allylphenyl glycidyl ether, etc.; glycidyl esters such as glycidyl acetate, glycidyl propionate, glycidyl pivalate, glycidyl methacrylate, glycidyl acrylate, glycidyl oleate, glycidyl resinate, etc.; alkyl glycidates such as methyl glycidate, ethyl glycidate, etc.; and other epoxides, as for, example, styrene oxide, α-methylstyrene oxide, butadiene monoxide, butadiene dioxide, epoxy stearates, 1-dimethylamino-2,3-epoxy propane, trimethyl 2,3-epoxypropyl ammonium chloride, etc. Particularly useful are ethylene oxide and its monosubstituted derivatives such as propylene oxide, epihalohydrins, etc.

The oxetanes which can be copolymerized with the epoxy cyclic sulfones in accordance with the invention are characterized by the structural formula

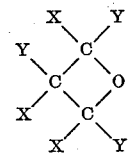

wherein each X and each Y substituent is any group other than those which react with the catalyst, such as free hydroxyl, primary amino, or secondary amino groups. By way of example, suitable X and Y substituents include such substituents as hydrogen; halogens including fluoro, chloro, bromo, and iodo substituent groups; alkyl, cycloalkyl, aryl, and aralkyl groups such as methyl, ethyl, propyl, butyl, cyclohexyl, phenyl, tolyl, benzyl, and the like; nitroalkyl such as nitromethyl, nitroethyl, and the like; nitratoalkyl such as nitratomethyl, nitratoethyl, and the like; cyanoalkyl such as cyanomethyl, cyanoethyl, and the like; alkoxy, aryloxy, aralkoxy, etc., such as methoxy, ethoxy, phenoxy, and the like; alkyl-, cycloalkyl-, aryl-, and aralkyloxymethyl groups such as methoxymethyl, ethoxymethyl, phenoxymethyl, benzyloxymethyl, and the like; acyloxyalkyl groups such as acetoxymethyl, acetoxyethyl, benzoxymethyl, and the like; haloalkyl groups such as chloromethyl, bromoethyl, iodomethyl, fluoromethyl, chloroethyl, chloropropyl, and the like; tertiary aminoalkyl groups such as dimethylaminoethyl, dimethylaminoethyl, and the like; acylamidoalkyl groups such as acetamidomethyl, sulfonamidomethyl, and the like; ethylenically unsaturated aliphatic radicals such as vinyl, propenyl, isopropenyl, allyl, methallyl, butenyl, allyloxymethyl, propenyloxymethyl, methallyloxymethyl, oleyl, and the like; and cycloalkyl or aryl radicals containing an ethylenically unsaturated substituent and cycloalkyl radicals containing an ethylenic double bond in the ring, as, for example, 4-vinylcyclohexyl, α-terpinyl, γ-terpinyl abietyl, cyclohexenylmethyl, o-allylphenyl, p-vinylbenzyl, and the like. Illustrative of typical oxetanes which the comonomer can comprise includes oxetane, 2-bromo oxetane, 2-methyl oxetane, 2-cyclohexyl oxetane, 2-benzyl oxetane, 2-nitropropyl oxetane, 2-cyanoethyl oxetane, 2-methoxy oxetane, 2-phenoxy oxetane, 2-methoxyethyl oxetane, 2-benzyloxymethyl oxetane, 2-allyl oxetane, 2-vinylbenzyl oxetane, 2-chloromethyl oxetane, and the like; 2,2 - bis(chloromethyl) oxetane, 2,2 - bis(2-chloroethyl) oxetane, 2,2-dimethyl oxetane, 2-chloro-2-methyl oxetane, 2 - fluoro - 2-bromoethyl oxetane, 2,2-bis(nitratomethyl) oxetane, 2 - methoxy-2-methyl oxetane, 2-carbomethoxy-2 - chloromethyl oxetane, 2-methallyl-2-methyl oxetane, and the like; 2 - vinyl-3,3-bis(chloromethyl) oxetane, 2-methoxy-3,3-bis(bromomethyl) oxetane, 2-vinylbenzyl-3,3-dimethyl oxetane, 2 - allyloxymethyl - 3 - chloromethyl - 3 - ethyl oxetane, 2-phenoxymethyl-3-fluoro-3-methyl oxetane, and the like; 2-methyl-3,3-bis(chloromethyl)-4-methyl oxetane, 2 - vinyl-3,3-bis(iodomethyl)-4 - methoxy oxetane, 2 - chloromethyl-3,3-dimethyl-4-chloromethyl oxetane, 2 - chloro - 3-ethyl-3-methoxymethyl-4-(o-allylphenyl) oxetane, 2 - ethyl - 3,3-bis (phenoxymethyl) - 4 - allyl oxetane, and the like; 2-methyl-3-methyl oxetane, 2 - chloromethyl - 3 - bromo oxetane, 2-methoxy-3-butenyl oxetane, 2-methallyloxymethyl-3-ethyl oxetane, 2-propenyl-3-bromoethyl oxetane, 2-methoxymethyl-3-propyl oxetane, and the like; 3-chloro-oxetane, 3-ethyl oxetane, 3-cyclohexyl oxetane, 3-phenyl oxetane, 3-methoxy oxetane, 3-allyl oxetane, 3-chloromethyl oxetane, 3-vinyl oxetane, and the like; 3,3-bis(chloromethyl) oxetane, 3,3-bis(bromomethyl) oxetane, 3,3-bis(iodomethyl) oxetane, 3,3 - bis(fluoromethyl) oxetane, 3,3-bis(2-chloroethyl) oxetane, 3-bromomethyl-3-chloromethyl oxetane, 3,3-dimethyl oxetane, 3,3-diethyl oxetane, 3,3 - bis(chloro) oxetane, 3,3-bis(bromo) oxetane, 3-chloro-3-chloromethyl oxetane, 3-bromo-3-ethyl oxetane, 3-fluoro-3-bromoethyl oxetane, 3-fluoro-3-chloro oxetane, 3-ethyl-3-methyl oxetane, 3-chloromethyl-3-ethyl oxetane, 3-chloromethyl-3-methyl oxetane, 3,3-bis(cyanomethyl) oxetane, 3,3-bis(nitratomethyl) oxetane, 3-chloromethyl-3-nitromethyl oxetane, 3-methoxy-3-methyl oxetane, 3-ethyl-3-methoxy-methyl oxetane, 3-ethoxymethyl-3-methyl oxetane, 3 - carbomethoxy - 3-chloromethyl oxetane, 3,3 - bis(phenoxymethyl) oxetane, 3 - vinyl - 3 - methyl oxetane, 3-allyl-3-chloromethyl oxetane, 3-isopropenyl-3-ethyl oxetane, 3-chloromethyl-3-(4-vinyl-cyclohexyl) oxetane, 3 - methyl-3-methallyl oxetane, 3,3 - bis(allyl) oxetane, and the like 2-methyl-3-methyl-4-methyl oxetane, 2 - ethyl-3-chloromethyl-4-ethyl oxetane, 2 - chloromethyl-3-vinyl-4-chloromethyl oxetane, 2 - methoxy - 3-bromo-4-methyl oxetane, 2-allyl - 3 - methoxy-4-carbomethoxy oxetane, and the like; 2 - methyl - 4 - methyloxetane, 2-vinyl-4-chloroethyl oxetane, 2-chloro-4-allyl oxetane, 2-methoxy-4-ethyl oxetane, 2-chloromethyl-4-chloromethyl oxetane, 2-chloromethyl-4-cyanomethyl oxetane, and the like. Moreover, mixtures of two or more of any of the above oxiranes or oxetanes can be used as the comonomer component whenever it is desired, as, for example, to modify the properties of the end product.

The homopolymerization or copolymerization of the epoxy cyclic sulfones can be carried out by injecting a solution of the catalyst into a solution of the epoxy cyclic sulfone or a mixture of the epoxy cyclic sulfone and oxirane or oxetane monomers, as the case may be, in an inert diluent such as heptane, benzene, toluene, methylene chloride, tetrahydrofuran, and the like, and agitating the mixture at from about −80° C. to about 200° C., and preferably at from about −50° C. to about 150° C. for several hours or more. Isolation of the homopolymer or copolymer will, of course, depend on the solubility properties of the polymer.

The epoxy cyclic sulfone monomers which are polymerized or copolymerized in accordance with this invention are 3,4-epoxy sulfolane, i.e., 6-oxa-3-thiabicyclo[3.10] hexane 3,3-dioxide; 7-oxa-3-thiabicyclo[4.1.0]heptane 3,3-dioxide; or 8-oxa-4-thiabicyclo[5.1.0]octane 4,4-dioxide. The 3,4-epoxy sulfolane is a known compound and can be prepared, for example, according to the methods of: van Lohuizen and Backer, Rec. Trav. Chim. 68, 1137 (1949); Sorenson, J. Org. Chem., 24, 1796 (1959); and Loev, J. Org. Chem., 26, 4394 (1961). The 7-oxa-3-thiabicyclo[4.1.0]heptane 3,3-dioxide and the 8-oxa-4-thiabicyclo[5.1.0]octane 4,4-dioxide are prepared by dehydrohalogenating the chlorohydrin or bromohydrin of Δ³-dihydrothiapyran 1,1-dioxide or Δ⁴-tetrahydrothiaepin 1,1-dioxide, respectively, with a base such as calcium hydroxide, barium carbonate and the like, using the methods of Sorenson and Loev cited above. The chlorohydrins are conveniently prepared by using Δ³-dihydrothiapyran 1,1-dioxide [prepared according to Fehnel and Lackey, J. Amer. Chem. Soc., 73, 2473 (1951), or Bateman, Cunneen and Ford, J. Chem. Soc. 1539 (1957)], or Δ⁴-tetrahydrothiaepin 1,1-dioxide [prepared according to Overberger and Katchman. J. Amer. Chem. Soc., 78, 1965 (1956)], as the case may be, instead of cyclohexene in the process described in Organic Syntheses, Collective Volume 1, page 158 (Wiley & Sons, Inc., New York, 1941).

The invention is further illustrated by the following examples which describe the preparation of homopolymers and copolymers of epoxy cyclic sulfones. All parts and percentages are by weight unless otherwise indicated, and all the examples were run under a nitrogen atmosphere. The molecular weight of the polymers is indicated by their reduced specific viscosity (RSV) as determined on a 0.1% solution of the polymer in hexamethyl phosphoramide at 100° C., unless otherwise indicated, it being understood that the polymer may be dissolved at a higher temperature, and the RSV then run at 100° C. or at a higher temperature, such as 135° C. or 170° C., if desired.

Example 1

A polymerization vessel was charged with 112 parts of methylene chloride as diluent and 10 parts of 3,4-epoxy sulfolane. After equilibrating at 50° C., 0.91 part (triethylaluminum basis) of catalyst was injected into the vessel. The catalyst was prepared by diluting a 1.5 molar solution of triethylaluminum in n-heptane to 0.5 molar with diethyl ether, adding water with stirring in an amount equal to 0.5 mole per mole of aluminum at 0° C. over a one-hour period, followed by adding acetylacetone with stirring in an amount equal to 0.5 mole per mole of aluminum at 0° C. over a period of 15 minutes, and then stirring for 1 hour at 0° C., and for 10 hours at 25° C. The polymerization was carried out by agitating the mixture for 25 hours at 50° C., adding an additional 0.91 part (triethylaluminum basis) of catalyst, and continuing the polymerization for 16 more hours at 50° C. The reaction was next shortstopped by the addition of 4 parts of ethanol, after which 2 volumes of diethyl ether were added to dilute the reaction mixture. The reaction mixture was washed twice with 3% aqueous hydrogen chloride for 1 hour with stirring and then washed neutral with water. Next, 0.5% of 4,4'-thiobis(3-methyl-6-tert-butyl phenol), based on the polymer, was added to the reaction mixture and the polymer was isolated from the mixture as 3 fractions: an ether-insoluble fraction (A) obtained by collecting the polymer precipitate, washing the polymer with diethyl ether and with ether containing 0.2% of 4,4'-thiobis(3-methyl-6-tert-butyl phenol), and drying at 80° C. under vacuum; an ether-soluble fraction (B) obtained by removing the solvents from the filtrate left from the isolation of (A), and drying at 80° C. under vacuum. and a water-soluble fraction (C) obtained by dialysis of the combined acid and water washes, stripping off the water from the dialyzed solution, and then drying at 80° C. under vacuum. The ether-insoluble polymer of 3,4-epoxy sulfolane was a gray-white, highly crystalline (by X-ray) powder having, by DTA, a melt range of 307 to 344° C. and a heat of fusion of 15.4 calories/gram. The ether-soluble polymer was a gray-white solid of high to moderate crystallinity which differed from that of the ether-insoluble fraction and had a DTA melt range of 142–193° C. (with decomposition) and a heat of fusion of 24.0 calories/gram. The water-soluble fraction was a fibrous gray powder of high crystallinity differing from that of both fractions A and B.

Example 2

The procedure of Example 1 was repeated except that 29 parts of toluene was used as diluent, the reaction time was 42 hours, and 0.91 part of catalyst (triethylaluminum basis) was used, all of the catalyst being added initially. In this example, the ether-insoluble polymer, product (A), was a highly crystalline, tan powder exhibiting the same pattern as product (A) of Example 1. The ether-soluble product (B) was a brown adherent film exhibiting a trace of crystallinity, and product (C) was a white, fibrous solid exhibiting a trace of crystallinity and having, by DTA, a melting point range of 118–166° C., which peaked at 147° C. The infrared analysis verified the presence of sulfone groups in the polymer structure.

Example 3

The procedure of Example 2 was repeated except that the catalyst used was 2.0 parts (dioctylmagnesium basis) of a catalyst prepared by reacting a 0.5 molar solution of di-n-octylmagnesium in ether with 0.6 mole (per mole of magnesium) of ammonia at 30° C. for 20 hours, and then heating for 19 hours at 90° C. The ether-insoluble polymer of 3,4-epoxy sulfolane was a highly crystalline, white powder exhibiting a crystalline pattern similar to that of product (A) of Example 1, and having a melting point range (DTA) of 310–360° C. which peaked at 355° C. and an RSV of 0.12. The polymer was insoluble in water and cold and boiling tetrachloroethane, but soluble in hot (100° C.) hexamethyl phosphoramide. The infrared spectrum had the 2 strongest absorptions at 1080 and 1288 cm.$^{-1}$ indicating the presence of sulfone groups. Elemental analysis was in agreement with the structure

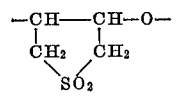

The ether-soluble product (18.8% conversion) was a viscous liquid, and the water-soluble product (0.1% conversion) was a grease.

Example 4

The procedure of Example 2 was repeated except that the catalyst was 1.58 parts (triisobutylaluminum basis) of a catalyst prepared by reacting a 0.5 molar solution of triisobutylaluminum in 50:50 diethyl ether:heptane with 0.5 mole of water per mole of aluminum. The ether-insoluble polymer was a white, highly crystalline powder exhibiting the same pattern as product (A) of Example 1. The ether-soluble product was a brown, flaky solid. The water-soluble product was a tough, fibrous solid of low to medium crystallinity exhibiting the same pattern as product (A), and having, by DTA, a melt range of 125–160° C. (small peak) and 160 to 300° C. (broad peak).

Example 5

The procedure of Example 1 was repeated except that 75 parts of tetrahydrofuran was used as diluent, and the catalyst was a catalyst prepared by reacting a 0.5 molar solution of dioctylmagnesium in ether with 0.4 mole (per mole of magnesium) of ammonia at 30° C. for 20 hours and then heating for 19 hours at 90° C., the catalyst being added as a single portion initially. The ether-insoluble polymer of 3,4-epoxy sulfolane was a highly crystalline, white powder exhibiting a crystalline pattern similar to that of product A of Example 1. It was soluble in hexamethylphosphoramide at 120° C. and had an RSV (at 100° C.) of greater than 0.2. The ether-soluble polymer was a grease, and the water-soluble fraction was a tacky mass.

Example 6

The general procedure of Example 4 was repeated except that the monomer charge was a mixture of 3,4-epoxy sulfolane and epichlorohydrin (30:70), the diluent was 61 parts of methylene chloride, the polymerization was conducted at 30° C. for 43 hours using 1.20 part of catalyst (triisobutylaluminum basis), 0.40 part being added initially and 0.80 part after 19 hours, and the reaction was shortstopped with 4 parts of a mixture of equal parts anhydrous ethanol and acetyl acetone. In this example, the polymer was isolated as two fractions: an ether-insoluble fraction obtained by collecting the polymer precipitate, washing with diethyl ether and then with ether containing 0.2% of 4,4'-thiobis (3-methyl-6-tert-butyl phenol) and drying at 80° C. under vacuum; and an ether-soluble fraction obtained by concentrating the filtrate left after isolation of the ether-insoluble polymer, adding 4 volumes of methanol to precipitate the polymer, collecting the polymer precipitate, washing the polymer twice with methanol and once with methanol containing 0.1% of 4,4'-thiobis (3-methyl-6-tert-butyl phenol), and drying at 80° C. under vacuum. The ether-insoluble copolymer of 3,4-epoxy sulfolane and epichlorohydrin (15.7% conversion) was a white rubber of low crystallinity and had an RSV of 1.3 as measured on a 0.1% solution in α-chloronaphthalene containing 3% acetyl acetone at 100° C. Based on the elemental analysis of the polymer, the copolymer contained 1.6% epoxy sulfolane unit. The ether-soluble polymer was a noncrystalline, tacky mass and was obtained in 1.8% conversion.

Example 7

The general procedure of Example 1 was repeated except that the monomer charge was a 90:10 mixture of ethylene oxide and 3,4-epoxy sulfolane, the diluent was 61 parts of methylene chloride, 0.66 part triethylaluminum basis of the catalyst of Example 1 was used by adding 0.22 part initially and 0.44 part after 19 hours reaction time, and the reaction was conducted at 30° C. for a total time of 27 hours. In this example, the ether-insoluble polymer was isolated from the reaction mixture, shortstopped as in Example 6 by diluting the mixture with 2 volumes of diethyl ether and collecting the insoluble polymer. The polymer was purified by washing once with ether, washing with 73 parts of 0.5% methanolic hydrogen chloride in 80:20 diethyl ether:methanol, washing neutral with 80:20 diethyl ether:methanol, and finally washing with diethyl ether containing 0.4% 4,4'-thiobis(3-methyl-6-tert-butyl phenol) and then dried for 16 hours at 50° C. under vacuum. The copolymer was a white, soft polymer (44% conversion) having an RSV of 3.4 as measured on a 0.1% solution in chloroform at 25° C. It was partially soluble in water, and highly crystalline by X-ray diffraction analysis. The sulfur analysis of 0.20% indicated that the copolymer contained 0.80% epoxy sulfolane units.

Example 8

Example 7 was repeated except that the monomer charge was a 70:30 mixture of propylene oxide and 3,4-epoxy sulfolane, the reaction time was 50 hours, and the ether-insoluble and ether-soluble polymer fractions were isolated acording to the procedure of Example 1. The ether-insoluble polymer (0.22% conversion) was a highly crystalline, white, solid copolymer of 3,4-epoxy. The folane with a small amount of propylene oxide. The ether-soluble copolymer (28% conversion) was a tacky rubber of low crystallinity having an RSV of 1.8, as measured on a 0.1% solution in chloroform at 25° C., and contained 0.92% epoxy sulfolane units based on the sulfur analysis (0.23% sulfur).

Example 9

Example 7 was repeated except that the monomer charge was an 80:20 mixture of trimethylene oxide and 3,4-epoxy sulfolane. The isolated diethyl ether-methanol insoluble copolymer was a tough, rubbery solid or moderate crystallinity (by X-ray diffraction analysis), and had an RSV of 8.0 and a melting point (DTA) of 35° C. The sulfur analysis indicated that the copolymer contained 3% epoxy sulfolane units.

Example 10

Example 3 was repeated except that the monomer charge was 8-oxa-4-thiabicyclo[5.1.0]octane 4,4-dioxide. The ether-insoluble polymer was a highly crystalline, white, powder having an RSV greater than 0.2 and a melting point (DTA) of greater than 250° C.

Example 11

Example 10 was repeated except that the monomer charge was 7-oxa-3-thiabicyclo[4.1.0]heptane 3,3-dioxide. The ether-insoluble polymer was a highly crystalline, white powder having an RSV greater than 0.3 and a melting point (DTA) of greater than 200° C.

The foregoing examples demonstrate the production of the epoxy cyclic sulfone homopolymers and copolymers of the invention. The polymers, and particularly the crystalline homopolymers, are useful for fibers, films, molded articles, coatings, and the like. Due to the polarity of the polymer, fibers and films thereof are more hydrophilic than those of unmodified polyethers and thus are particularly useful for yarns and fabrics wherein "feel" or "hand" and high water vapor transmission properties are important.

The hydrophilic nature of the epoxy cyclic sulfone units of the copolymers greatly improves the adhesion of the copolymers to a variety of substrates such as paper, cotton, wood, glass, metal, etc. Thus, the copolymers are ideally suited as adhesives for bonding related polyether coatings to such substrates. The crystalline copolymers which contain small amounts of oxirane or oxetane comonomer are particularly useful as plastics, unoriented or oriented films, oriented fibers, and the like.

What I claim and desire to protect by Letters Patent is:

1. A solid polymer comprising repeating units of the formula:

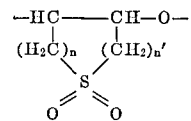

where $n$ and $n'$ are each 1 or 2, said polymer having an RSV greater than 0.1 and being a homopolymer of an epoxy cyclic sulfone or a copolymer thereof with at least one other epoxide selected from the group consisting of oxiranes and oxetanes and containing from 0.2 to 99% of said units derived from the epoxy cyclic sulfone.

2. The composition of claim 1 wherein the polymer is a homopolymer of 3,4-epoxy sulfolane.

3. The composition of claim 2 wherein the homopolymer is a crystalline homopolymer of 3,4-epoxy sulfolane.

4. The composition of claim 1 wherein the polymer is a copolymer of 3,4-epoxy sulfolane with at least 1 comonomer which is an oxirane or oxetane.

5. The composition of claim 4 wherein the comonomer is epichlorohydrin.

6. The composition of claim 4 wherein the comonomer is propylene oxide.

7. The composition of claim 4 wherein the comonomer is ethylene oxide.

8. The composition of claim 4 wherein the comonomer is trimethylene oxide.

9. The composition of claim 1 wherein the homopolymer is a crystaline homopolymer of 8-oxo-4-thiabicyclo-[4.1.0]heptane 3,3-dioxide.

10. The composition of claim 1 wherein the homopolymer is a crystalline homopolymer of 8-oxo-4-thiabicyclo-[5.1.0]octane 4,4-dioxide.

References Cited

UNITED STATES PATENTS 3,366,645    1/1968    Dittmann et al. ____ 260—332.1
3,389,093    6/1968    Busler et al.

JAMES A. SEIDLECK, Primary Examiner

U.S. Cl. X.R.

117—161; 156—327; 161—192, 213, 265; 260—332.1, 33.2

PO-1050
(5/69)

UNITED STATES PATENT OFFICE
CERTIFICATE OF CORRECTION

Patent No. 3,476,718      Dated November 4, 1969

Inventor(s) Edwin J. Vandenberg (Case 117)

It is certified that error appears in the above-identified patent and that said Letters Patent are hereby corrected as shown below:

Column 8, line 40 (claim 9) of printed patent - "8-oxo-4-" should read --7-oxa-3- --

Column 8, line 43 (claim 10) of printed patent - "oxo" should read --oxa--

SIGNED AND
SEALED
FEB 17 1970

(SEAL)
Attest:

Edward M. Fletcher, Jr.
Attesting Officer

WILLIAM E. SCHUYLER, JR.
Commissioner of Patents